(12) United States Patent
Bunger

(10) Patent No.: US 6,202,673 B1
(45) Date of Patent: Mar. 20, 2001

(54) VALVE SELF-PIERCING TAP

(75) Inventor: Lars Bunger, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 0 days.

(21) Appl. No.: 09/091,640

(22) PCT Filed: Dec. 17, 1996

(86) PCT No.: PCT/CH96/00444

§ 371 Date: Mar. 1, 1999

§ 102(e) Date: Mar. 1, 1999

(87) PCT Pub. No.: WO97/23747

PCT Pub. Date: Jul. 3, 1997

(30) Foreign Application Priority Data

Dec. 22, 1995 (CH) ........................................ 43/96

(51) Int. Cl.[7] ............. B23B 41/08; F16L 41/06; F16K 31/50; F16K 43/00
(52) U.S. Cl. ................. 137/318; 30/92; 251/267
(58) Field of Search ................ 137/318; 285/197; 408/87, 101, 137, 79, 80, 83, 102; 30/92, 93; 251/266, 267, 268

(56) References Cited

U.S. PATENT DOCUMENTS

| | | | |
|---|---|---|---|
| 4,730,636 | * | 3/1988 | Volgstadt et al. ............. 137/318 |
| 4,809,735 | * | 3/1989 | Volgstadt et al. ............. 137/318 |
| 5,345,964 | * | 9/1994 | Friedel ........................ 137/318 |
| 5,348,045 | * | 9/1994 | Serve ........................... 137/318 |
| 5,577,529 | * | 11/1996 | Katz ............................. 137/318 |
| 5,732,732 | * | 3/1998 | Gross et al. .................. 137/318 |

FOREIGN PATENT DOCUMENTS

| | | |
|---|---|---|
| 1633594 | 1/1952 | (DE) . |
| 3744693 | 12/1988 | (DE) . |
| 4244741 | 6/1994 | (DE) . |
| 4331817 | 3/1995 | (DE) . |
| 4408817 | 6/1995 | (DE) . |
| 4309941 | 2/1997 | (DE) . |
| 9723747 | 7/1997 | (WO) . |

* cited by examiner

Primary Examiner—George L. Walton
(74) Attorney, Agent, or Firm—Tarolli, Sundheim, Covell, Tummino & Szabo L.L.P

(57) ABSTRACT

The invention relates to a valve self-piercing tap for a plastic tube with a plastic housing (1) which has a branch connection member (2) and holds a valve body (3), in which a blocking body (5) engaged with a threaded spindle (6) and carrying a punch ring (9) for forming an opening in the plastic tube is displaceably arranged to be moved into axial engagement with a valve seat (10) to block access to the branch connection member (2). To avoid sealing rings, the valve body has at least one circumferential groove (12) with a side (13) directed towards the outlet (11). The housing is injection-molded around the valve body.

7 Claims, 2 Drawing Sheets

VALVE SELF-PIERCING TAP

FIELD OF THE INVENTION

The present invention refers to a valve self-piercing tap for a plastic tube.

BACKGROUND OF THE INVENTION

A self-piercing tap of this kind is known from DE 44 08 817 C1, comprising a plastic housing which is provided with a branch connection member and in which a valve is inserted with the help of a plurality of sealing rings, both between the housing and the valve as well as between the components of the valve. The branch sleeve projecting into the branch connection member is designed as a separate part. A tap of this kind comprises a complicated construction and is lavish during assembly. The sealing rings are subjected to aging and, thus, become leaky.

It is the object of the invention to provide a valve self-piercing tap which essentially avoids the use of sealing rings that are separately to mount and which is of simple design and mounting.

SUMMARY OF THE INVENTION

To meet this and other objects, the present invention provides a self-piercing valve tap for a piping made of plastic material. The valve tap comprises a housing made of plastic material. The housing has an inlet opening as well as a branch connection member. A valve body is located in the interior of the housing. Further provided is a valve seat in the interior of the housing and located close to the inlet opening of the housing.

The outer surface of the valve body is provided with one or a plurality of continuous circumferential groove(s) and one or more continuous circumferential leg portion(s) directed towards the valve seat. The housing is injection molded around the valve bush member such that the circumferential groove is or the circumferential grooves are filled up along their entire extension with the plastic material of the housing.

BRIEF DESCRIPTION OF THE DRAWINGS

In the following, the invention will be further explained, with the help of embodiments illustrated in the accompanying drawings, in which.

DETAILED DESCRIPTION OF PREFERRED EMBODIMENTS

Figure 1:
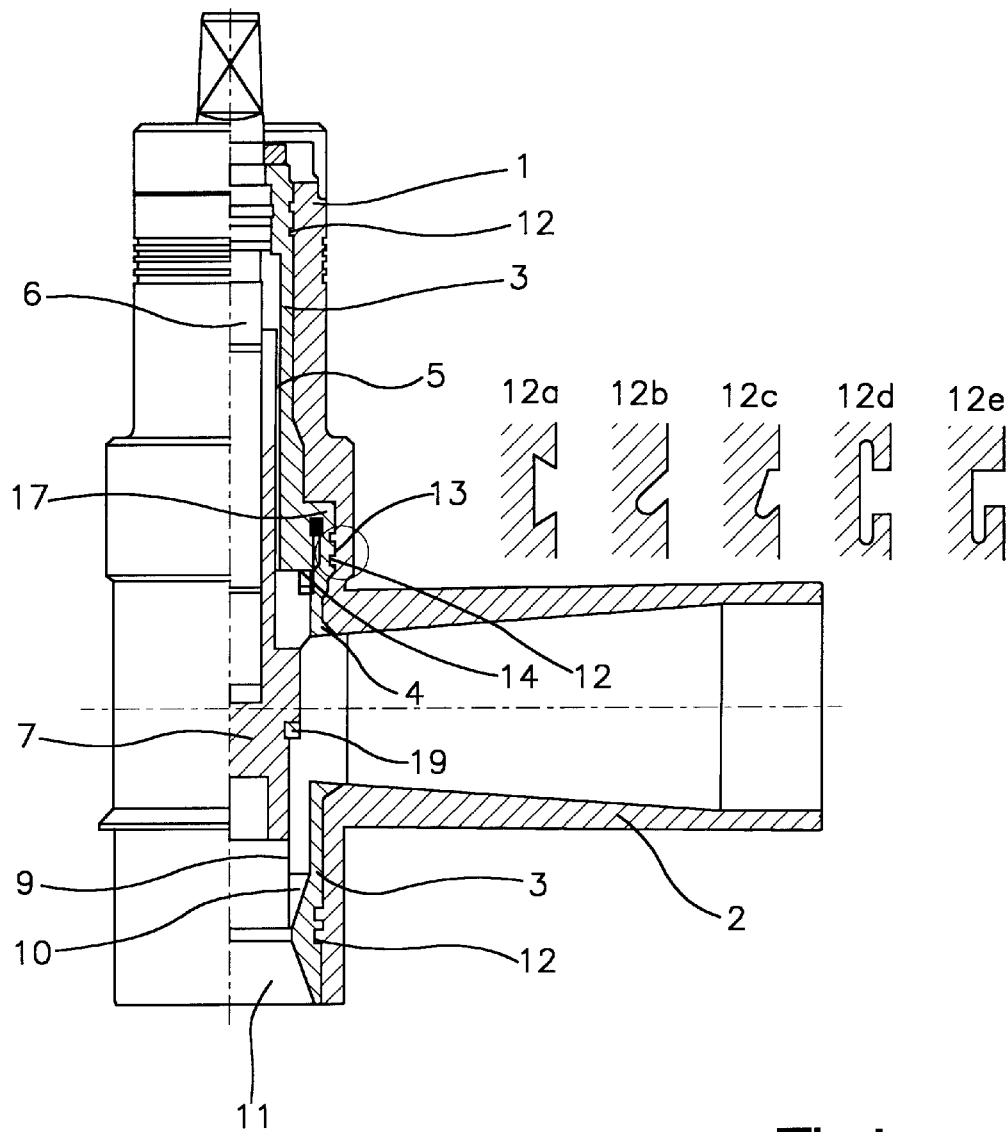
FIG. 1 shows an embodiment of a valve self-piercing tap in a partially axially sectioned view.

The valve self-piercing tap shown in FIG. 1 comprises a housing 1 injection-molded of plastic material that is provided with a branch connection member 2 integrally formed therewith. The housing 1 can be integrally formed with a not shown saddle, by means of which it can be put onto and connected to a plastic piping, or it can be welded to such a saddle.

The interior of the housing 1 receives a valve body 3 which is provided with a branch sleeve 4 projecting into the branch connection member 2. The valve body 3 itself is provided with a stop body 5 in a non-rotatable manner which comprises for example a hexagonal cross section for ensuring its non-rotatability, while the valve body 3 is provided with a corresponding internal cross sectional shape. The stop body 5 is engaged by a threaded spindle 6 such that it is axially movable in the valve body 3 by rotating the threaded spindle 6.

The stop body 5 forms a ring 7. The ring 7 bears a sealing element 19 and a punch ring 9 whose cutting edge can penetrate into the plastic piping by an axial displacement of the stop body 5 through a valve seat 10 located near an inlet opening 11 of the housing 1 to provide an aperture in the plastic piping to which the valve self-piercing tap is to be fixed. The hollow punching tool 9, thereby takes the punched-out portion of the plastic piping, and the sealing element 19 is pressed against the valve seat 10 such that the inlet opening 11 is closed.

The outer surface of the valve body 3 comprises at least one circumferential groove 12 having a leg 13 directed towards the inlet opening 11. The groove can be of I-shaped design, or it can have a geometry as shown in the details 12a, 12b, 12c, 12d and 12e. The legs 13 are arranged at least partially in opposite directions to the built-up pressure. Thereby, an optimal sealing can be achieved. The housing 1 is injection-molded around the valve body 3 and around the branch sleeve 4 thereof, such that the plastic material of the housing 1 fills also the groove 12. Thereby, a self adjusting seal is realized insofar as a medium eventually intruding into the space between housing 1 and valve body 3 will press, according to its pressure, the leg 13 towards the bottom of the groove 12, such that an automatic sealing effect results. Similarly, the outer surface of the branch sleeve member 4 can be provided with one or several continuous circumferential groove(s) that are also filled with plastic material when the housing is injection molded there around.

Thereby, the otherwise usual sealing rings between the housing 1 and the valve body 3 can be avoided, and the construction and the assembly are facilitated.

The valve body 3 forms an abutment shoulder 14 for the stop body 5.

Figure 2:
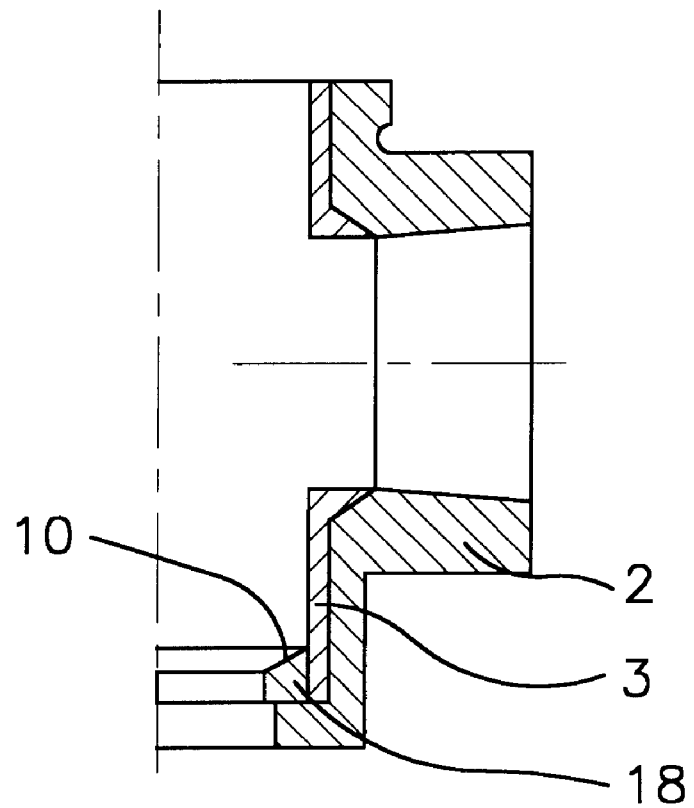
FIG. 2 shows a modified embodiment of a valve self-piercing tap in a selective sectional view.

In the embodiment illustrated in FIG. 2, the valve body 3 is connected by means of a threaded joint to a ring 18 which is integrally formed with the valve seat 10.

What is claimed is:

1. A valve self-piercing tap for use on plastic piping, said tap comprising:

a valve body, said valve body extending substantially axially and having a valve seat located near an axial end of said valve body, said valve body further having at least one circumferential groove extending around an outer surface of said valve body, said groove having at least one leg directed both radially inwardly toward an inner surface of said valve body and axially toward said valve seat; and a housing being formed from plastic and having an inlet opening located on an end of said housing corresponding to said valve seat, said plastic being injection molded onto said outer surface of said valve body, said plastic filling said circumferential groove of said valve body, said plastic within said circumferential groove forming a seal which self adjusts as pressure acts to separate said housing and said valve body.

2. The valve self-piercing tap in claim 1 further being defined by:

said valve body having a branch sleeve which extends at least partially in a radial direction, and said housing having a radially extending branch connection which is injection molded onto said branch sleeve.

3. The valve self-piercing tap in claim 1 further being defined by:

said valve body further having a stop body that is axially movable in said valve body.

4. The valve self-piercing tap in claim 3 further being defined by:

said valve body further having a threaded spindle, said threaded spindle engaging said stop body, said stop body being moved axially upon rotation of said threaded spindle.

5. The valve self-piercing tap in claim 3 further being defined by:

said stop body having a punch ring, said punch ring having a cutting edge capable of penetrating a plastic pipe.

6. The valve self-piercing tap in claim 3 further being defined by:

said stop body having a sealing element, said sealing element closing said inlet opening of said housing when said sealing element is pressed against said valve seat.

7. The valve self-piercing tap in claim 1 further being defined by:

a diameter of said circumferential groove on said outer surface of said valve body being smaller than a diameter of said circumferential groove in an area between said outer surface and said inner surface of said valve body.

* * * * *